(12) United States Patent
Hikosaka

(10) Patent No.: US 8,876,402 B2
(45) Date of Patent: Nov. 4, 2014

(54) RELAY OPTICAL CONNECTOR

(75) Inventor: Tomohiro Hikosaka, Gotemba (JP)

(73) Assignee: Yazaki Corporation, Tokyo (JP)

( * ) Notice: Subject to any disclaimer, the term of this patent is extended or adjusted under 35 U.S.C. 154(b) by 32 days.

(21) Appl. No.: 12/841,676

(22) Filed: Jul. 22, 2010

(65) Prior Publication Data

US 2011/0026884 A1 Feb. 3, 2011

(30) Foreign Application Priority Data

Aug. 3, 2009 (JP) ................................. 2009-180332

(51) Int. Cl.
  *G02B 6/38* (2006.01)
(52) U.S. Cl.
  CPC ............ *G02B 6/3847* (2013.01); *G02B 6/3822* (2013.01); *G02B 6/3863* (2013.01)
  USPC .............................................. 385/72; 385/60
(58) Field of Classification Search
  USPC ......................................................... 385/72
  See application file for complete search history.

(56) References Cited

U.S. PATENT DOCUMENTS

| 5,214,730 | A | * | 5/1993 | Nagasawa et al. ............... 385/59 |
| 5,608,828 | A | * | 3/1997 | Coutts et al. .................... 385/59 |
| 6,254,282 | B1 | | 7/2001 | Ishihara et al. |

FOREIGN PATENT DOCUMENTS

| CN | 1457443 A | 11/2003 |
| CN | 101324688 A | 12/2008 |
| EP | 0 056 192 A1 | 7/1982 |
| EP | 0 191 432 A2 | 8/1986 |
| EP | 1 562 059 B1 | 7/2008 |
| FR | 2 399 673 A1 | 3/1979 |
| JP | 59-24818 A | 2/1984 |
| JP | 59-038707 A | 3/1984 |
| JP | 61-267708 A | 11/1986 |
| JP | 8-50214 A | 2/1996 |
| JP | 2000-47065 A | 2/2000 |
| JP | 2000-047071 A | 2/2000 |
| JP | 2003-177278 A | 6/2003 |

OTHER PUBLICATIONS

European Search Report, dated Jun. 9, 2011, issued in Application No. 10170988.9.

Communication dated Oct. 10, 2012 from the State Intellectual Property Office of the People's Republic of China in counterpart Chinese application No. 201010243207.3.

Office Action, dated Apr. 5, 2013, issued by the Japanese Patent Office in counterpart Japanese Patent Application No. 2009-180332.

(Continued)

*Primary Examiner* — Eric Wong
(74) *Attorney, Agent, or Firm* — Sughrue Mion, PLLC

(57) ABSTRACT

In a relay optical connector 1, a part 16 of a ferrule 4 is butted against a part 17 of a ferrule 5 in a ferrule end face 14 of the ferrule 4 in which an optical fiber 2 for an optical connection is exposed and a ferrule end face 15 of the ferrule 5 in which an optical fiber 3 is exposed and the one optical fiber 2 and the other optical fiber 3 are arranged so as not to come into contact with each other. Specifically, one of the ferrule end faces 14 and 15 is surface-ground so as to extend along a surface at right angles to an optical axis L and the other thereof is diagonally surface-ground so as to be inclined at a prescribed angle θ relative to the surface at right angles to the optical axis.

2 Claims, 2 Drawing Sheets

(56) References Cited

OTHER PUBLICATIONS

Office Action dated Nov. 30, 2012 issued by the Japanese Patent Office in counterpart Japanese Patent Application No. 2009-180332.

Office Action dated Oct. 10, 2013, issued by the State Intellectual Property Office of the People's Republic of China in counterpart Chinese Application No. 201010243207.3.

\* cited by examiner

RELAY OPTICAL CONNECTOR

BACKGROUND OF THE INVENTION

1. Technical Field

The present invention relates to a relay optical connector for connecting optical propagation members such as optical fibers to each other.

2. Description of the Related Art

As for the relay optical connector for connecting the optical fibers to each other, for instance, an optical transmission and reception relay is disclosed in below-describe patent literature 1. In the optical fibers respectively in the relay optical connector, ferrules are provided in terminals thereof. End faces of the ferrules are respectively worked so that end faces of the optical fibers are exposed so as to be flush therewith. The end faces of the ferrules come into contact with each other in a ferrule connecting member forming the relay optical connector. In the relay optical connector, the end faces of the ferrules come into contact with each other, so that the optical fibers (the end faces of the optical fibers) are connected to each other.

Patent literature 1: JP-A-2000-47071

In the above-described usual technique, since the end faces of the optical fibers are allowed to come into contact with each other, a below-described problem arises. Namely, when an impact or vibration is transmitted to contact parts, since flaws may be possibly generated on the end faces of the optical fibers, especially, a relay optical connector to be mounted on a vehicle has a problem in view of shortage of reliability.

In such a relay optical connector as to be mounted on a vehicle, there is a method in which end faces of ferrules are separated by a prescribed space or more from each other so that the above-described flaws are not generated on the end faces of optical fibers. However, in this case, since a relatively large space is provided between the end faces of the optical fibers, a problem arises that an optical loss is increased.

Since the above-described space is increased more in accordance with the accumulation of dimensional tolerances of parts which form the relay optical connector, there is a fear that a performance is caused to be unstable and the optical loss is caused to be increased.

SUMMARY OF THE INVENTION

The present invention is devised by considering the above-described circumstances, and it is an object of the present invention to provide a relay optical connector that can suppress an optical loss and prevent the damage of end faces of an optical connection.

A relay optical connector of the present invention according to a first aspect of the invention that is devised to solve the above-described problems is characterized in that a part of a first member is butted against a part of a second member in a first end face of the first member in which one optical propagation member for an optical connection is exposed and a second end face of the second member in which the other optical propagation member is exposed, and the one optical propagation member and the other optical propagation member are arranged so as not to come into contact with each other.

According to the present invention having such a feature, in the optical connection, when a part of the first member and a part of the second member in the first end face and the second end face are butted against each other, a space or gap formed between the end faces of the optical propagation members can be maintained to a minimum. The space or gap is maintained to a minimum, so that an optical loss can be sufficiently suppressed. Further, since the optical propagation members are arranged so as not to come into contact with each other, even when for instance, an impact or vibration is transmitted, the damage of the end faces to be optically connected can be prevented.

A relay optical connector of the present invention defined in a second aspect of the invention is characterized in that, in the relay optical connector according to the first aspect of the invention, one of the first end face and the second end face is surface-ground so as to extend along a surface at right angles to an optical axis and the other thereof is diagonally surface-ground so as to be inclined at a prescribed angle relative to the surface at right angles to the optical axis.

According to the present invention having such a feature, such a surface as to extend along the surface at right angles to the optical axis is butted against such a surface as to be inclined at the prescribed angle relative to the surface at right angles to the optical axis. According to the present invention, the prescribed angle, in other words, for instance, an angle sandwiched by the surfaces of the butted parts is adjusted so that the space or gap formed between the end faces of the optical propagation members may be adjusted.

A relay optical connector of the present invention defined in a third aspect of the invention is characterized in that in the relay optical connector according to the first aspect of the invention, one of the first member and the second member is urged toward the other.

According to the present invention having such a feature, for instance, even when an impact or vibration is transmitted to the relay optical connector, the increase of the space or gap formed between the end faces of the optical propagation members can be prevented by an urging force.

According to the present invention defined in the first aspect of the invention, the optical loss can be effectively suppressed and the damage of the end faces of an optical connection can be satisfactorily prevented. According to the present invention, a reliable relay optical connector can be effectively provided.

According to the present invention defined in the second aspect of the invention, a preferable exemplary embodiment can be effectively provided to suppress the optical loss and prevent the damage of the end faces of the optical connection.

According to the present invention defined in the third aspect of the invention, a displacement in the direction of the optical axis can be effectively prevented. Thus, the increase of the optical loss can be effectively restrained from increasing.

BRIEF DESCRIPTION OF THE DRAWINGS

FIG. 2(a) is a sectional view of main parts of the relay optical connector of the present invention and FIG. 2(b) is a sectional view of a comparative example corresponding to FIG. 2(a).

DESCRIPTION OF THE PREFERRED EMBODIMENTS

Figure 1:
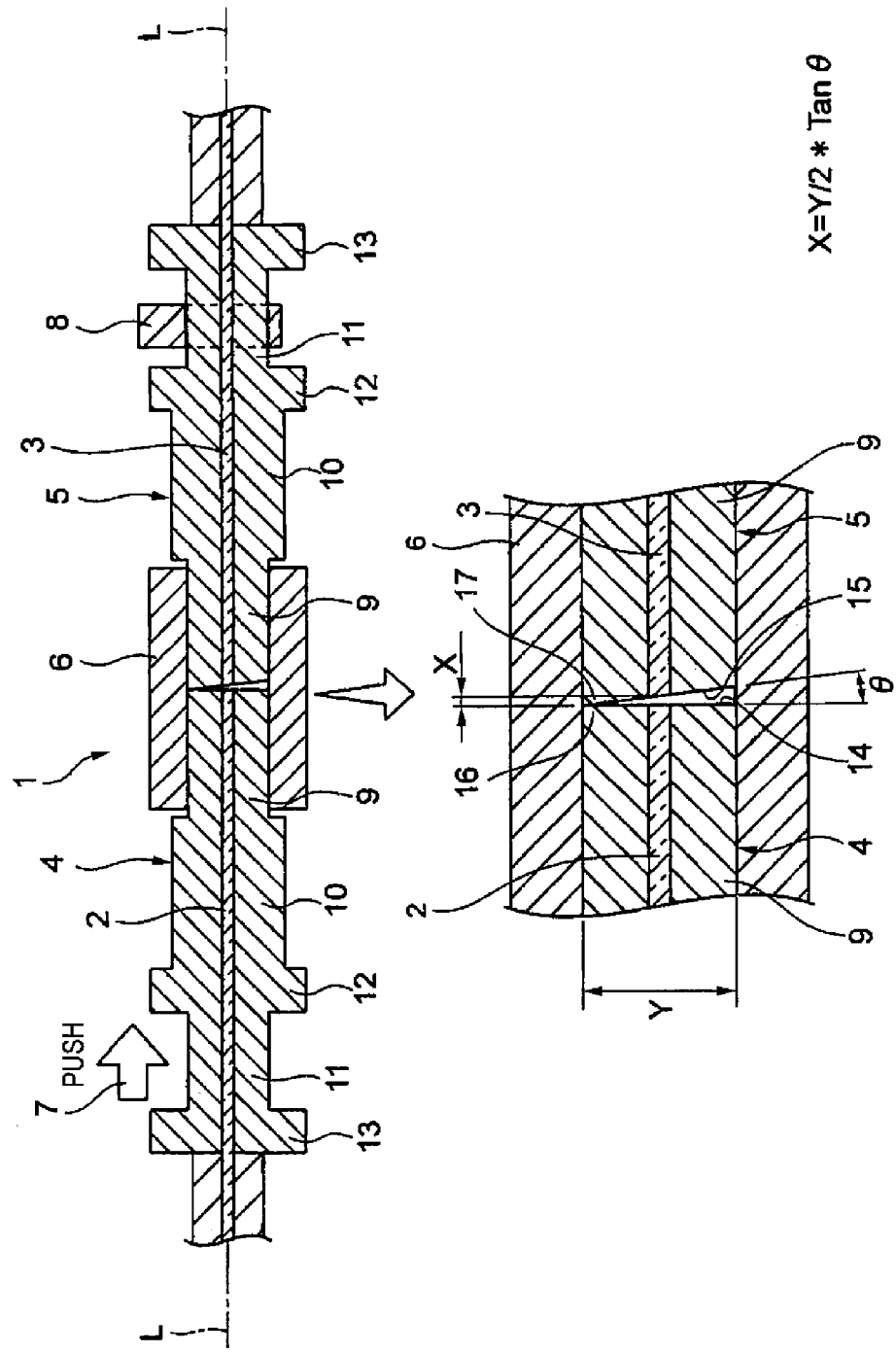
FIG. 1 is a sectional view showing a relay optical connector of the present invention.
Figure 2:
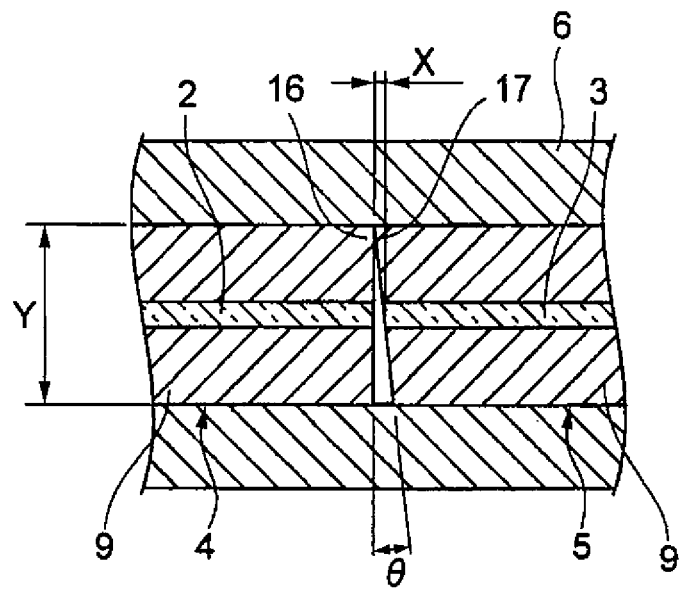
FIG. 2 is an explanatory view of an optical loss.
Figure 2:
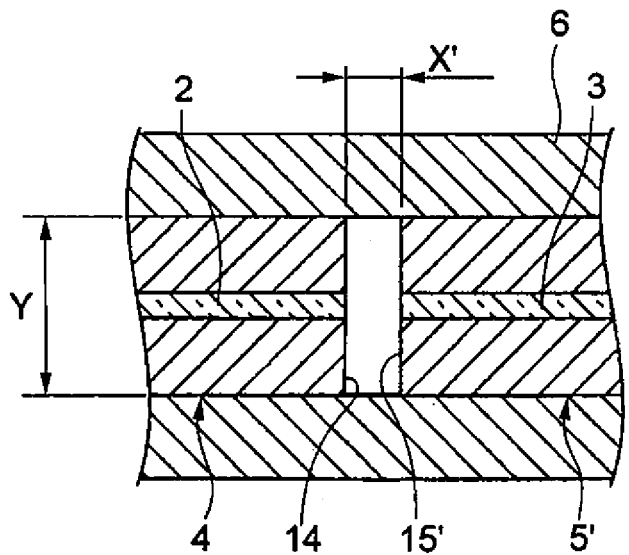

Now, one exemplary embodiment of the present invention will be described below by referring to the drawings. FIG. 1 is a sectional view showing a relay optical connector of the present invention. FIG. 2 is an explanatory view of an optical loss.

In FIG. 1, a relay optical connector designated by reference numeral 1 serves to optically connect optical fibers 2 and 3 to each other. The relay optical connector includes ferrules 4 and 5 respectively provided in terminals of the optical fibers 2 and 3 and a sleeve 6 into which ends (front parts) of the ferrules 4 and 5 are respectively inserted. Further, the relay optical connector 1 includes an urging member (for instance, a coil spring or a leaf spring), which is not shown in the drawing, to urge the ferrule 4 in the direction of an arrow mark 7, a holder 8 for holding the ferrule 5 to regulate a position and a housing not shown in the drawing.

As the optical fibers 2 and 3, an optical fiber having a diameter of an optical fiber of, for instance, 0.01 mm to 1 mm is used. In this exemplary embodiment, although the optical fiber is not especially limited, the optical fiber is used which has a diameter of a core of an optical fiber of 0.2 mm and a diameter of an optical fiber of 0.23 mm (values of the diameters are considered to be one examples). One of the optical fibers 2 and 3 (or both of them) may be changed to an optical propagation member composed of a core and a clad which is provided in a cylindrical member (the optical propagation member capable of transmitting an optical signal may be used without limiting to the optical fibers 2 and 3).

The ferrules 4 and 5 are tubular members into which the terminals of the optical fibers 2 and 3 can be inserted, and include front parts 9 inserted into the sleeve 6, intermediate parts 10 whose diameters are larger than those of the front parts 9 and rear parts 11 whose diameters are smaller than those of the intermediate parts. In boundary parts between the intermediate parts 10 and the rear parts 11, annular flanges 12 are provided. Further, in ferrule rear end positions of the rear parts 11, annular flanges 13 are also provided. In this exemplary embodiment, in the ferrule 4, an urging force (see the arrow mark 7) from the urging member not shown in the drawing is applied to the position of the flange 12 or 13. On the other hand, the ferrule 5 is held in the position of the rear part 11 by the holder 8.

A ferrule end face 14 located at an end position of the ferrule 4 (a ferrule end position) is formed and surface-ground so as to extend along a surface at right angles to an optical axis L of the optical fiber 2. On the other hand, a ferrule end face 15 located at an end position of the ferrule 5 is formed and diagonally surface-ground (an angle grinding) so as to be inclined at a prescribed angle relative to the surface at right angles to the optical axis L of the optical fiber 2.

The ferrules 4 and 5 are formed so that when the front parts 9 are respectively inserted into the sleeve 6, a part 16 of the ferrule end face 14 and a part 17 of the ferrule end face 15 are butted against each other. Further, the ferrules 4 and 5 are formed so that during the butting operation, an end face of the optical fiber 2 exposed at a central position of the ferrule end face 14 and an end face of the optical fiber 3 exposed at a central position of the ferrule end face 15 do not come into contact with each other.

The butting operation of the part 16 of the ferrule end face 14 against the part 17 of the ferrule end face 15 or a non-contact state of the end faces of the optical fibers 2 and 3 is realized by forming the ferrule end face 14 by the above-described surface-grinding operation and forming the ferrule end face 15 by the above-described diagonal surface-grinding operation.

Assuming that a grinding or polishing angle of the ferrule end face 15 is $\theta$, in other words, an angle sandwiched by the ferrule end face 14 and the ferrule end face 15 is $\theta$ as shown in FIG. 1, the part 16 and the part 17 are butted against each other by adjusting the angle $\theta$, so that a space or gap between the end faces of the optical fibers 2 and 3 can be maintained to a fixed value (an effect for maintaining the space or gap to the fixed value can be increased by the operations of the urging member and the holder 8).

Here, when it is assumed the space (the gap) between the end faces of the optical fibers 2 and 3 is X, diameters of the front parts 9 of the ferrules 4 and 5 are Y and the grinding or polishing angle of the ferrule end face 15 is $\theta$, a relation expressed by $X=(Y/2)* \tan \theta$ is established. Thus, assuming that the diameters Y of the front parts 9 of the ferrules 4 and 5 are set to 2 mm, and the grinding or polishing angle $\theta$ of the ferrule end face 15 is set to 1.5°±–0.5° (a value of Y or $\theta$ is considered to be one example), when the grinding or polishing angle $\theta$ is 1°, the space X (gap) between the end faces of the optical fibers 2 and 3 is 0.0175 mm. When the grinding or polishing angle $\theta$ is 2°, the space X (gap) between the end faces of the optical fibers 2 and 3 is 0.035 mm (the space X is suppressed to a minute dimension). When the grinding or polishing angle $\theta$ is set to a small value, since the thickness in the part 17 of the ferrule end 15 is sufficiently ensured, the part 17 is not broken due to the butting operation. Namely, the space X is maintained.

As can be understood from the above-description, even when for instance, an impact or vibration is transmitted to the relay optical connector 1, the damage of the end faces of the optical fibers 2 and 3 as parts to be optically connected can be prevented. Further, the space X (gap) formed between the end faces of the optical fibers 2 and 3 can be maintained to a minimum, so that an optical loss can be suppressed.

In the above-described structure, the ferrule 4 corresponds to a first member described in claims. Further, the ferrule 5 corresponds to a second member described in claims. Further, the ferrule end face 14 corresponds to a first end face described in claims. Further, the ferrule end face 15 corresponds to a second end face described in claims. Further, the optical fibers 2 and 3 correspond to optical propagation members described in claims. When the sleeve 6 is a ferrule connecting member, the form of the sleeve 6 is not limited to an illustrated from.

Now, referring to FIG. 2, specific effects of the present invention will be described below.

FIG. 2(a) is a sectional view of main parts of the relay optical connector 1 of the present invention. Here, the diameters Y of the front parts 9 of the ferrules 4 and 5 are set to 2 mm and the grinding or polishing angle $\theta$ of the ferrule end face 15 is set to 2°. As a result, under a state that the part 16 of the ferrule end face 14 and the part 17 of the ferrule end face 15 are butted against each other, the space X (gap) between the end faces of the optical fibers 2 and 3 is 0.035 mm and the optical loss is 1.4 dB.

On the other hand, FIG. 2(b) is a sectional view of a comparative example corresponding to FIG. 2(a). Here, the diameters Y of front parts 9 of ferrules 4 and 5' are set to 2 mm and the grinding or polishing angle $\theta$ of a ferrule end face 15' is set to 0° (namely, ferrule end faces 14 and 15' are parallel to each other) and a space X' (gap) between the end faces of optical fibers 2 and 3 is set to 0.2 mm (the setting is applied to a usual relay optical connector to be mounted a vehicle. The end faces are not butted against each other). Since the space X' is relatively large, an optical loss is 2.2 dB. As compared with the optical loss of 1.4 dB of the relay optical connector 1 of the present invention, it can be understood that the optical loss of the comparative example apparently increases. Thus, it can be understood that the present invention is effective.

In the above-described explanation, the ferrule end face 14 is surface-ground so as to extend along the surface at right angles to the optical axis L of the optical fiber 2. However, the ferrule end face 14 is not surface-ground in such a way as described above, and may be diagonally surface-ground so as to be inclined at a prescribed angle relative to the optical axis. In this case, for instance, when the grinding or polishing angle θ of the ferrule end face 14 is set to 1° and the grinding or polishing angle θ of the ferrule end face 15 is set to 2° (when one ferrule end face is diagonally surface-ground slightly larger than the other ferrule end face), it is to be understood that the butting operation or the setting of a minimum space can be realized. Accordingly, the same effects as those described above can be achieved.

It is to be understood that the present invention can be variously changed within a range which does not change the gist of the present invention.

What is claimed is:

1. A relay optical connector, comprising:
one optical propagation member for an optical connection;
other optical propagation member;
a first ferrule member having a first end face on which the one optical propagation member is exposed; and
a second ferrule member having a second end face on which the other optical propagation member is exposed;
wherein a part of the first ferrule member in the first end face of the first ferrule member is butted against a part of the second ferule member in the second end face of the second ferrule member and the one optical propagation member and the other optical propagation member are arranged so as not to come into contact with each other; and
wherein one of the first end face and the second end face is surface-ground so as to extend along a surface at right angles to an optical axis and the other thereof is diagonally surface-ground so as to be inclined at a prescribed angle relative to the surface at right angles to the optical axis,
wherein the first ferule member is a tubular ferule in which the one optical propagation member is inserted,
wherein the second ferule member is a tubular ferule in which the other optical propagation member is inserted,
wherein one of the first ferrule member and the second ferrule member is mechanically biased toward the other,
wherein the relay optical connector includes a holder holding the other of the first ferrule member and the second ferrule member to regulate a position of the other ferrule member, and a sleeve into which at least a part of the first ferrule member and the second ferrule member are inserted such that a part of the first ferrule member and a part of the second ferrule member are abutted against each other, and
each of the first ferrule member and second ferrule member include a front part inserted into the sleeve, an intermediate part whose diameter is larger than that of the front part and a rear part whose diameter is smaller than that of the intermediate part and the other of the first ferrule member and the second ferrule member is held in a position of the rear part by the holder.

2. The relay optical connector according to claim 1, wherein each of the first ferrule member and second ferrule member include a first annular flange in a boundary part between the intermediate part and the rear part and a second annular flange in a rear end position of the rear part, and a biasing spring force is mechanically applied to at least one of the first flange and the second flange of the one of the first ferrule member and the second ferrule member.

* * * * *